July 7, 1942.　　　　H. D. ALLEN　　　　2,288,987
TAPING TOOL
Filed Nov. 1, 1941　　　2 Sheets-Sheet 1
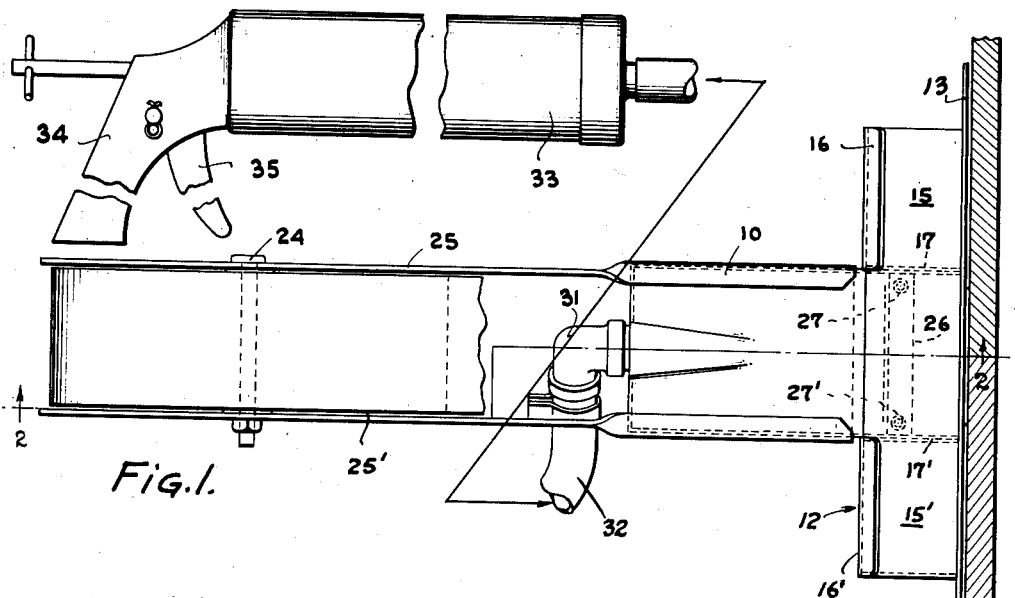
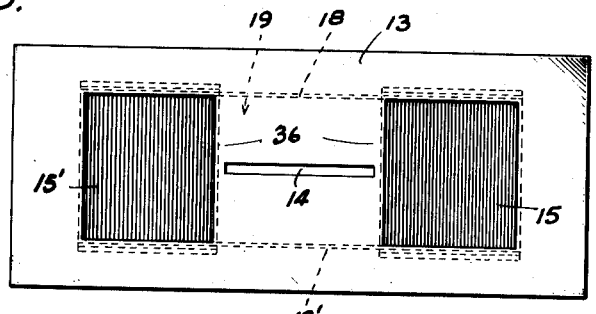
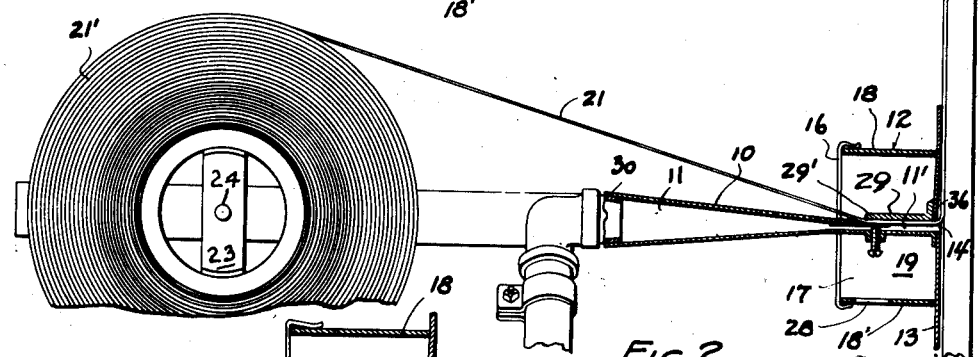
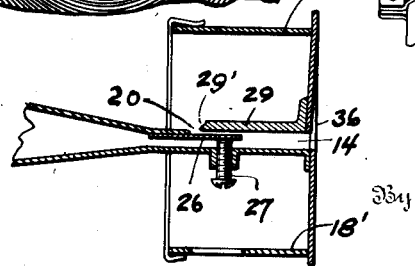
Inventor
H. D. Allen
A. Yates Dowell
Attorney

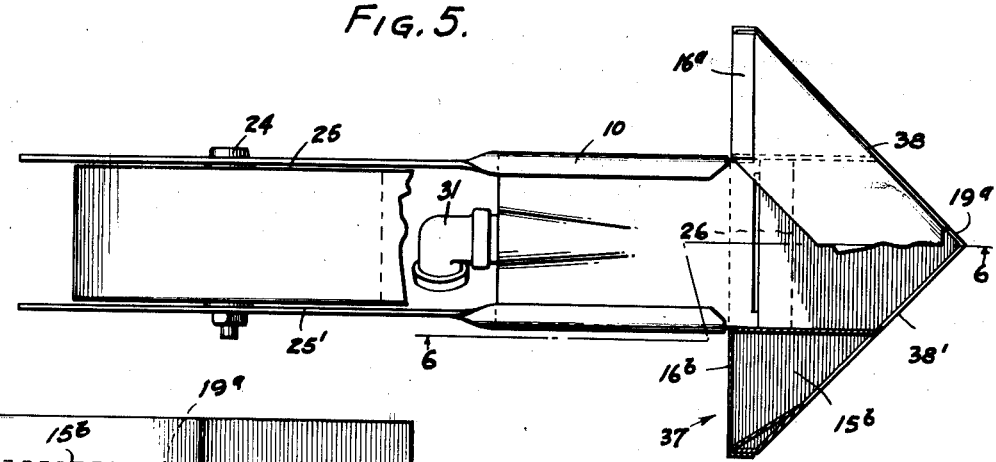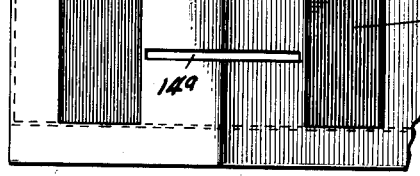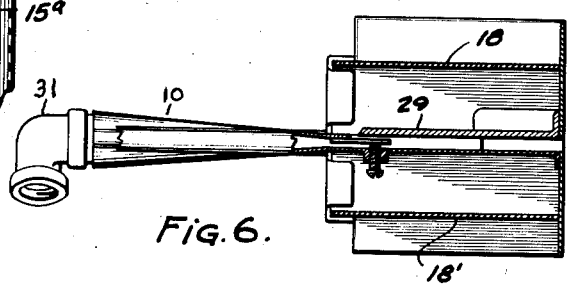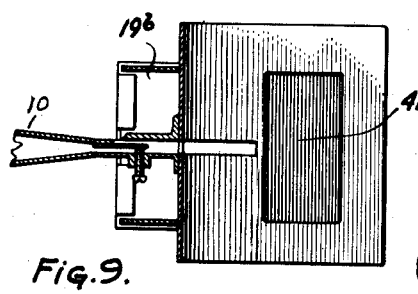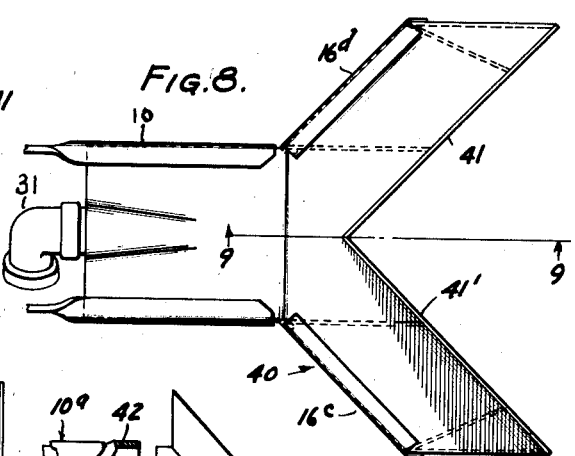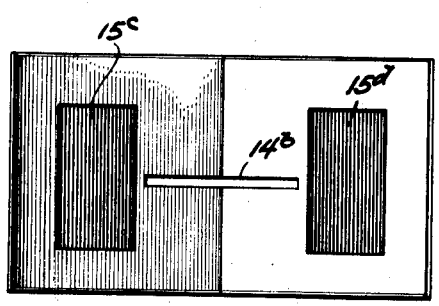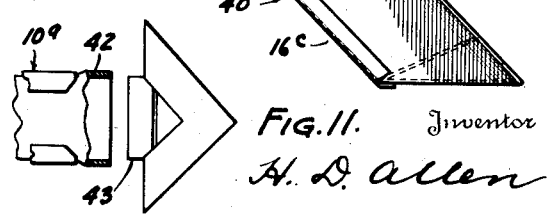

Patented July 7, 1942

2,288,987

UNITED STATES PATENT OFFICE 2,288,987

TAPING TOOL

Horace D. Allen, Columbia, S. C., assignor to United States Gypsum Company, Chicago, Ill., a corporation of Illinois Application November 1, 1941, Serial No. 417,559

24 Claims. (Cl. 216—33)

This invention relates to a tool for taping and sealing joints in the construction of walls from wall boards or analogous prefabricated units; and has for an object to materially facilitate this type of work.

The tool disclosed in this application constitutes an improvement on, or an alternate construction with respect to the tools disclosed in my copending applications Ser. No. 401,259 filed July 5, 1941, and Ser. No. 401,546 filed July 8, 1941.

More specifically stated, the invention provides a self-contained unit whereby the sealing tape used for taping and sealing the joints between adjacent edges of wall board or like members may be fed to the joint during application of the tape, the tape being conditioned to insure a smooth, finished appearance and the proper amount of cement applied to the tape and joint, while at the same time the work is rendered easier and considerably expedited.

In applying tape to wall board joints, it is necessary that the worker make a smooth, finished job of each strip within a limited time, otherwise the cement dries and the tape thereafter cannot be worked or handled. Thus, after an improperly applied strip of tape dries the only remedy is to either remove the strip or else lay another strip thereover. In either case, the job is unsatisfactory or botched, and furthermore, the job as a whole is slowed and valuable time is lost. The tool as herein disclosed enables a workman to apply the strip easily and quickly without any danger of the tape becoming wrinkled or deformed and drying or setting in such unsightly condition. Furthermore, due to its simplicity in construction and operation, any ordinary workman may operate the tool without extensive preliminary training or teaching.

Additional objects incidental to the foregoing will become apparent in view of the following description taken in conjunction with the drawings, wherein:

Fig. 1 is a plan view, or a view looking down on the tool while the latter is operating on a wall board joint;

Fig. 2 is a section taken substantially on the line 2—2 Fig. 1;

Fig. 3 is a face view of a trowel head forming part of the improved tool;

Fig. 4 is an enlarged view of the right-hand portion of Fig. 2 to better illustrate the structure;

Fig. 5 is a view similar to Fig. 1, partially in section, of the tool when using an inside corner trowel head;

Fig. 6 is a sectional view taken substantially on the line 6—6, Fig. 5;

Fig. 7 is a working face view of the trowel head of Fig. 5;

Fig. 8 is a top plan view of the tool when using an outside corner trowel head;

Fig. 9 is a section taken on the line 9—9, Fig. 8;

Fig. 10 is a face view of the trowel head of Fig. 9; and

Fig. 11 illustrates a telescoping joint whereby the respective trowel heads may be detachably mounted on a common cement and tape feeder.

Referring to the drawings in detail, the tool comprises a combined handle and housing 10 which is preferably of elongated, flattened shape and defines a cement feeding chamber 11 which gradually converges towards its discharge end and terminates in a reduced extrusion slot 11'.

Mounted on the outer end of the housing 10 is a trowel head, generally indicated at 12 and comprising a trowel 13, note particularly Fig. 3, which is shown as square but may be of any desired contour and has formed therein a cement and tape feeding slot 14 in communication with the extrusion slot 11'. On the back of the trowel 13 are a pair of excess-cement-receiving chambers 15 and 15' which lie at opposite ends of the feeding slot 14 and open into the face of the trowel 13, note Fig. 3. These chambers are defined by upwardly or rearwardly extending walls provided with detachable covers 16 and 16' shown in the present instance as being held in place through frictional contact but which may be applied in any suitable manner so that they may be readily removed to facilitate cleaning of the chambers 15 and 15'. On the back of the trowel 13, the chambers 15 and 15' are separated by spaced walls 17 and 17' which project rearwardly adjacent opposite edges of the handle 10, and these walls in conjunction with walls 18 and 18' define a central chamber 19 which is closed to the face of the trowel 13 but is open at the rear side of the trowel to lighten the construction and facilitate adjustment and cleaning of parts.

The reduced portion 11' of the cement feeding chamber 11 has in one side wall thereof a tape feeding slot 20, note particularly Fig. 4, adapted to have tape 21 fed therethrough from a roll 21'. Tape of this type is generally formed with a series of perforations to permit the cement to extrude to the side opposite that which overlies the joint and provide what is in effect a series of "keys" for insuring an efficient and lasting application of the tape. The tape may be purchased in the market in roll form, each roll being on a central spool or the like indicated at 22 in Fig. 2. To accommodate the roll 21', a reel 23 is rotatably mounted on a bearing pin 24, which in turn is journaled in rearwardly extending brackets 25 and 25', the latter being secured to or formed as part of the handle or housing 10, note also Fig. 1.

At the point where the tape passes through the slot 20, an adjustable combined pressure plate and valve member 26 is located, said member as here shown being in the form of a flat strip of metal or the like secured at one edge to the adjacent wall of the housing 10 at the rear of the slot 20 and projecting over said slot and being adjustable by means of screws 27 and 27' which abut at their inner ends against said member. To facilitate access to said screws, the wall 13' of the central chamber 19 is formed with holes 28. By adjusting the plate 26, pressure on the tape may be controlled and escape of cement through slot so avoided. Also, by completely closing the slot 20, cement only may be fed to a joint for finishing purposes, as will be more fully explained hereinafter in the description of the operation. An abutment bracket 29 is secured to the inner surface of the trowel 13 in the central chamber 19 and forms a continuation of the housing wall 10 at this point, said bracket preferably having a knife edge 29' adjacent the slot to facilitate tearing of the tape.

To feed cement to the chamber 11, the wall of the latter is formed with an opening 30 to accommodate a feed nozzle 31 having attached thereto a flexible hose 32 leading to a cement gun 33 provided with a handle 34 and a finger trigger or lever 35. This gun may be of any suitable type and is preferably hand-operated so that the workman may hold the tool in one hand and the gun in the other. However, the feeding means may be foot-operated or the cement may be under constant pressure and admitted to the chamber 11 by a valve release. By actuating the trigger or lever 35, a constant feed of cement may be forced through the hose 32 into and through the chamber 11 and thence through the slot 14 in the face of the trowel 13, while at the same time the tape 21 may be fed through the slot 20 and extrusion slot 11' and moistened during application to the joint, as will be more fully hereinafter explained.

The area in the face of the trowel 13 immediately in the rear of or trailing the slot 14 is depressed or formed with a rectangular recess 36 which is of sufficient depth to accommodate the tape as it is fed thereover, while at the same time the area on the opposite sides of this recess is preferably slightly raised to restrict spread of cement. Should there be an excess of cement extruded through slot 14, it will be squeezed laterally of the tape into the chambers 15 and 15'. This construction restricts the cement to a localized area of the trowel face and guides and insures proper pressure on the tape as well as proper application of cement to the latter without smearing the area of the wall board adjacent the edges of the tape.

In Figs. 5, 6 and 7 a trowel head for inside corners is illustrated, and as far as tape application and conditioning is concerned, has features in common with the trowel head 12 first described and which is adapted for flat surfaces. The handle housing 10 and coacting parts compare with like parts shown in Figs. 1 to 4 inclusive and are therefore given similar reference numerals. The trowel head, generally indicated at 37 in this instance is provided with a working surface defined by walls 38 and 38' arranged at an angle of approximately 90° with respect to one another, to thereby fit the corner of a room and which is approximately of a similar angle. The feed slot is here indicated at 14a, the extrusion chambers at opposite ends thereof at 15a and 15b, and the central chamber at 19a.

The covers for the excess cement chambers are also detachably mounted in this instance and are indicated at 16a and 16b. The pressure plate 26 and coacting parts are of the same construction as heretofore described and are given similar reference numerals.

In Figs. 8, 9 and 10 a trowel head generally indicated at 40 particularly adapted for outside corners is shown. Here also parts which correspond to those indicated in Figs. 1 to 4 inclusive are given similar reference numerals. The trowel head in this instance has a working surface defined by converging walls 41 and 41' arranged at an angle of approximately 90° to accommodate an outside corner. Here also the working face of the trowel is provided with a feed slot indicated at 14b and excess cement chambers 15c and 15d provided with detachable covers 16c and 16d.

Fig. 11 shows a construction whereby the respective trowel heads may be detachably connected to the handle housing, here indicated at 10a. The said housing at its lower end is shown terminating in a flared portion 42 which is adapted to telescope over a flange 43 projecting upwardly from the trowel head and in effect constituting an extension of the housing 10a.

In actual practice, the tool has been operated with a marked degree of success in the following manner:

A roll of tape may be mounted on the reel 23 and the free end of the tape threaded through the slot 20 and thence through the slot 14 in the face of the trowel 13. The operator may start the feed in any conventional manner, as for example, by securing the leading end of the tape at the top of the joint with a thumb tack or he may hold the same with one hand for an instant while he starts the feed with the other. The housing 10 serves as a handle which may be grasped in the hand and the tool brought downwardly over the joint with the trowel face bearing against the tape. As the tape feeds, the required amount of cement is forced into the chamber 11 by the gun 33, which may be conveniently held in the other hand of the operator. As the tape passes through the restricted portion 11' of the chamber 11 it is automatically moistened on both sides and conditioned for application to the joint. By adjusting the pressure plate 26, the proper amount of frictional pressure may be exerted on the tape to obtain the desired feed while at the same time any excess cement is prevented from backing out through the tape feeding slot 20. The chambers 15 and 15' which are in communication with the depression 36 in the face of the trowel receive any excess cement, or any cement above that required for efficient application of the tape and prevent the cement from "smearing" out beyond the tape and onto the wall board. These chambers also avoid the necessity of any accurately controlled amount of feed by means of the gun 33. Thus the tool moistens the tape on both sides, eliminates surplus cement and picks up this surplus and finishes the joint in one stroke.

Usually in the practice of taping wall board joints, it is desirable to go over the job twice, the first time to lay the tape and the next time to insure that the cement is devoid of any wrinkles or irregularities. The second operation is done after the tape dries, usually after a twenty-four hour period, at which time additional cement is applied to the tape. In the present instance, if it should be found desirable or necessary to go over the joint with an additional application of cement, it is only necessary to adjust pressure plate 26 against the member 29 to close the tape feeding slot 20, whereupon cement only may be fed through the chamber 11 and slot 14 onto the tape.

The inside and outside trowel heads shown in Figs. 5 to 10 may be operated in the same manner as the flat surface trowel head shown in Figs. 1 to 4 inclusive. However, in this instance, it may be desired to dispense with automatic feeding of the tape and use the tool to first apply the cement by bringing the trowel downwardly over the joint and then apply the tape by another stroke of the trowel.

The tool is simple to operate and at the same time materially speeds up this type of work and reduces the labor involved. Access may be readily had to all parts of the tool for quick removal of excess cement and cleaning. Actual practice has demonstrated that the improved tool not only eases the work but also results in a more perfect job.

It will be understood that certain changes in construction and design may be adopted without departing from the spirit and scope of the invention as defined by the appended claims.

What is claimed is:

1. In a tool for taping wall board joints, a trowel having a slot in the working face thereof, means for guiding tape to and through said slot, and means for simultaneously applying cement to the tape.

2. In a tool for taping wall board joints, a housing having a chamber for cement therein, a trowel head secured on said housing and having a slot in communication with the cement chamber, means for feeding cement to said chamber and thence through said slot, and means for simultaneously feeding tape through said chamber and slot and whereby the tape is moistened on both sides while being applied to a joint.

3. In a tool for taping wall board joints, a housing defining a chamber for cement, a trowel connected to the outlet end of said chamber and having a slot in communication with said chamber, said trowel having receiving pockets or chambers adjacent said slot to receive excess material extruded through the slot, and means for feeding cement to and through said chamber and slot.

4. In a tool for taping wall board joints, means defining a passage for cement, a working tool connected to said means and having a slot in the working face thereof in communication with said passage, said working tool having one or more receiving pockets or chambers adjacent said slot to receive excess material extruded through the slot, and means for feeding cement to and through said passage and slot.

5. In a tool for taping wall board joints, means defining a passage for cement, a trowel connected to said means and having a slot in the working face thereof communicating with said passage, said trowel having a recess in the working surface thereof and one or more receiving pockets or chambers adjacent said slot and recess, means for feeding cement and tape through said passage and slot, the tape while being applied to the joint passing through said slot and thence along said recess, the excess cement extruding from opposite sides of the recess into said pockets.

6. In a tool for taping wall board joints, means defining a passage for cement, a trowel connected to said means and having a slot in the working face thereof communicating with said passage, said trowel having a recess in the working surface thereof and one or more receiving pockets or chambers adjacent said slot and recess, means for feeding cement and tape through said passage and slot, the tape while being applied to the joint passing through said slot and thence along said recess, the excess cement extruding from opposite sides of the recess into said pockets, and removable covers for said pockets or chambers at the rear of the trowel.

7. In a taping tool for wall board joints, a housing defining a passage for cement, a trowel secured to one end of said housing at the outlet of said passage and being formed with a slot in the face thereof in communication with said outlet, said trowel being formed with openings adjacent said slot to receive excess material extruded through the slot, and means for feeding cement and tape through said passage and slot.

8. In a tool for taping wall board joints, a housing defining a passage for cement, said passage terminating in an extrusion outlet, a trowel head secured to the end of said housing and having an elongated slot therein in communication with said extrusion outlet, the wall of the housing at one side of said passage being formed with a slot for feeding tape into and through the passage and through the slot in said trowel, and means for feeding cement to said passage, the cement and tape being fed simultaneously through the outlet end of said passage and slot of the trowel.

9. In a tool for taping wall board joints, means defining a passage for cement, a trowel connected to said means and having a slot in communication with the outlet of said passage, said trowel being formed with openings at opposite ends of the slot therein and a depressed portion defining a recess between said openings on the trailing side of said slot, means for forcing cement through said passage, and means for simultaneously feeding tape through said outlet and slot, the tape moving in said recess as it is applied to the joint.

10. In a tool for taping wall board joints, means defining a passage for cement, a trowel carried by said means and having a slot in the working face thereof in communication with said passage, the wall of said passage being formed with a slot for feeding tape therethrough and thence through the slot in the trowel, and adjustable means for restricting the dimensions of the slot and for controlling the resistance to movement of the tape and to also prevent back flow of cement through said slot.

11. In a tool for taping wall board joints, a housing defining a passage for cement, a trowel secured to said housing and having an elongated slot in communication with said passage, said housing having a slot in a wall thereof whereby tape may be fed into and through the passage and the slot in the working face of the trowel, a plate-shaped member adapted to overlie said tape feeding slot, and means for adjusting said member with respect to said latter slot and the tape passing through the slot.

12. In a tool for taping wall board joints, a housing defining a passage for cement, a trowel secured to said housing and having an elongated slot in communication with said passage, said housing having a slot in a wall thereof whereby tape may be fed into and through the passage and the slot in the working face of the trowel, a plate-shaped member adapted to overlie said tape feeding slot, means for adjusting said member with respect to said latter slot and the tape passing through the slot, and a member having a knife edge presented to the tape feeding slot to facilitate severance of the tape in case it is desired to dispense with the latter.

13. In a tool for taping wall board joints, a housing defining a passage for cement, a trowel secured to said housing and having an elongated slot in communication with said passage, said housing having a slot in a wall thereof whereby tape may be fed into and through the passage and the slot in the working face of the trowel, a plate secured to the inner wall of the housing and projecting over said tape-feeding slot, and means for adjusting said plate with respect to said latter slot to prevent escape of cement through the slot and to control the feed of the tape.

14. A tool for taping wall board joints comprising a housing defining a handle and provided with a passage for cement, a trowel head connected to said housing including a trowel having an elongated slot registering with the outlet end of the passage, said trowel being formed with openings adjacent opposite ends of said slot to receive excess cement extruded through the slot, said head having walls in rear of the trowel defining chambers in communication with said openings, said housing having a slot therein leading to said passage for guiding tape into and through the passage and thence through the slot in the trowel, and means for feeding cement to said passage.

15. A tool for taping wall board joints comprising a housing defining a handle and provided with a passage for cement, a trowel head connected to said housing including a trowel having an elongated slot registering with the outlet end of the passage, said trowel being formed with openings adjacent opposite ends of said slot to receive excess cement extruded through the slot, said head having walls in rear of the trowel defining chambers in communication with said openings, said housing having a slot therein leading to said passage for guiding tape into and through the passage and thence through the slot in the trowel, means for feeding cement to said passage, and means carried by said housing for mounting a roll of tape.

16. A tool for taping wall board joints comprising a housing shaped to provide a passage for cement, a trowel head carried by said housing and having a slot therein communicating with the discharge end of said passage, means for simultaneously feeding cement and tape to and through said passage and slot, and means detachably mounting said trowel head.

17. In a tool for taping wall board joints, a trowel having walls arranged at an approximate 90° angle to accommodate room corners, said trowel having an elongated slot in the working face thereof, and means for extruding cement through said slot and onto a wall board joint.

18. The method of applying tape to wall board joints which consists in guiding the tape through a chamber having cement therein and thence over the working surface of a trowel, and drawing the trowel over the joint to apply the tape to the latter and simultaneously apply cement to the tape.

19. The method of sealing and taping wall board joints which consists in guiding tape adjacent the working surface of a trowel and thence over the joint to be taped, drawing the trowel over the tape and joint and simultaneously extruding cement through said working surface to apply cement to the tape and the surface to which the tape is applied.

20. In a tool for taping wall board joints, a housing having a chamber for cement therein, a trowel head secured on said housing and having a slot in communication with the cement chamber, means for feeding cement through said slot, and means for simultaneously feeding tape through said chamber and slot and whereby the tape is moistened on both sides while being applied to a joint.

21. In a hand portable unit for adhesively applying building tape to walls, means for supporting a supply of tape, means for pressing said tape onto a wall as said unit is moved thereover, and means for applying adhesive to said tape at the point of application to the wall in advance of said pressing means.

22. In a tool for applying tape to a wall board joint the combination with means for directing a stream of cement to said joint, of means to simultaneously direct a strip of tape into adhesive contact with said joint.

23. In a tool for applying tape to a wall board joint the combination with means for directing a stream of cement under pressure to said joint, of means to simultaneously direct a strip of tape into adhesive contact with said joint.

24. Apparatus for applying tape to wall board joints comprising a flexible conduit terminating in a nozzle, said conduit and nozzle being adapted to direct cement from a supply under pressure through said nozzle and means to simultaneously direct tape through said nozzle in contact with said cement.

HORACE D. ALLEN.